(12) United States Patent
Jenkins

(10) Patent No.: US 8,311,129 B2
(45) Date of Patent: Nov. 13, 2012

(54) TEMPORAL VIDEO FILTERING

(75) Inventor: Michael V. Jenkins, Buda, TX (US)

(73) Assignee: LifeSize Communications, Inc., Austin, TX (US)

( * ) Notice: Subject to any disclaimer, the term of this patent is extended or adjusted under 35 U.S.C. 154(b) by 1550 days.

(21) Appl. No.: 11/611,494

(22) Filed: Dec. 15, 2006

(65) Prior Publication Data
US 2007/0139517 A1    Jun. 21, 2007

Related U.S. Application Data

(60) Provisional application No. 60/751,152, filed on Dec. 16, 2005.

(51) Int. Cl.
*H04N 11/04*     (2006.01)
(52) U.S. Cl. .......... 375/240.29; 375/240.12; 375/240.14
(58) Field of Classification Search ............. 375/240.29, 375/240.12, 240.14
See application file for complete search history.

(56) References Cited

U.S. PATENT DOCUMENTS

| | | | |
|---|---|---|---|
| 3,542,947 A | | 11/1970 | Thurston |
| 4,542,459 A | * | 9/1985 | Riederer ................ 600/431 |
| 5,038,216 A | | 8/1991 | Easterly et al. |
| 5,335,321 A | * | 8/1994 | Harney et al. ............. 345/503 |
| 5,347,599 A | | 9/1994 | Yamashita et al. |
| 5,450,500 A | * | 9/1995 | Brett ...................... 382/162 |
| 5,528,274 A | | 6/1996 | Hyodo |
| 5,528,740 A | | 6/1996 | Hill et al. |
| 5,579,053 A | | 11/1996 | Pandel |
| 5,617,539 A | | 4/1997 | Ludwig et al. |
| 5,629,734 A | | 5/1997 | Hamilton et al. |
| 5,654,759 A | | 8/1997 | Augenbraun et al. |
| 5,661,525 A | | 8/1997 | Kovacevic et al. |
| 5,689,641 A | | 11/1997 | Ludwig et al. |
| 5,719,540 A | | 2/1998 | Takaoka et al. |
| 5,751,338 A | | 5/1998 | Ludwig, Jr. |
| 5,757,424 A | | 5/1998 | Frederick |
| 5,831,666 A | | 11/1998 | Palmer et al. |
| 5,832,143 A | | 11/1998 | Suga et al. |
| 5,847,755 A | * | 12/1998 | Wixson et al. ................ 348/149 |
| 6,043,844 A | | 3/2000 | Bist et al. |
| 6,173,069 B1 | | 1/2001 | Daly et al. |

(Continued)

OTHER PUBLICATIONS

U.S. Appl. No. 11/461,635, entitled "Dual Sensor Video Camera", by Michael V. Jenkins, filed Aug. 1, 2006.

(Continued)

*Primary Examiner* — David Czekaj
*Assistant Examiner* — Jonathan Torchman
(74) *Attorney, Agent, or Firm* — Meyertons Hood Kivlin Kowert & Goetzel, P.C.; Jeffrey C. Hood

(57) ABSTRACT

In various embodiments, temporal filtering may be used to reduce noise over time in a series of video frames. A temporal filter may use previous filtered frames to reduce the noise in a current frame. For example, a temporal filter may filter noise in still parts of an image more strongly than in moving parts of the image. In some embodiments, a temporal filter requiring less processing power may include a method for detecting motion between a set of pixels and applying the temporal filter based on the detected motion. For example, if substantial motion is not detected, the temporal filter for the block of pixels may be stronger (i.e., reduce more noise) than the temporal filter applied to a block of pixels for which substantial motion has been detected.

28 Claims, 11 Drawing Sheets

U.S. PATENT DOCUMENTS

| | | | |
|---|---|---|---|
| 6,285,801 B1 * | 9/2001 | Mancuso et al. | 382/268 |
| 6,301,370 B1 | 10/2001 | Steffens et al. | |
| 6,563,537 B1 | 5/2003 | Kawamura et al. | |
| 6,594,688 B2 | 7/2003 | Ludwig et al. | |
| 6,614,474 B1 | 9/2003 | Malkin et al. | |
| 6,717,578 B1 | 4/2004 | Deering | |
| 6,816,904 B1 | 11/2004 | Ludwig et al. | |
| 6,850,565 B2 | 2/2005 | Martins et al. | |
| 6,965,705 B1 | 11/2005 | Ma et al. | |
| 7,035,481 B2 | 4/2006 | Kim et al. | |
| 7,088,392 B2 | 8/2006 | Kakarala et al. | |
| 7,130,446 B2 | 10/2006 | Rui et al. | |
| 7,426,315 B2 * | 9/2008 | Frishman et al. | 382/268 |
| 7,548,660 B2 * | 6/2009 | Chiu | 382/266 |
| 2002/0150166 A1 * | 10/2002 | Johnson | 375/240.29 |
| 2003/0174146 A1 | 9/2003 | Kenoyer | |
| 2004/0183897 A1 | 9/2004 | Kenoyer et al. | |
| 2005/0117814 A1 * | 6/2005 | Riemens et al. | 382/275 |
| 2006/0082676 A1 | 4/2006 | Jenkins et al. | |
| 2006/0262333 A1 | 11/2006 | Jenkins | |

OTHER PUBLICATIONS

"A history of video conferencing (VC) technology" http://web.archive.org/web/20030622161425/http://myhome.hanafos.com/~soonjp/vchx.html (web archive dated Jun. 22, 2003); 5 pages.

"MediaMax Operations Manual"; May 1992; 342 pages; VideoTelecom; Austin, TX.

"MultiMax Operations Manual"; Nov. 1992; 135 pages; VideoTelecom; Austin, TX.

Ross Cutler, Yong Rui, Anoop Gupta, JJ Cadiz, Ivan Tashev, Li-Wei He, Alex Colburn, Zhengyou Zhang, Zicheng Liu and Steve Silverberg; "Distributed Meetings: A Meeting Capture and Broadcasting System"; Multimedia '02; Dec. 2002; 10 pages; Microsoft Research; Redmond, WA.

P. H. Down; "Introduction to Videoconferencing"; http://www.video.ja.net/intro/; 2001; 26 pages.

Elan Amir, Steven Mccanne, and Hui Zhang; "An Application Level Video Gateway"; In Proceedings of ACM Multimedia '95; 1995; 18 pages.

"Polycom Demonstrates High Definition (HD) Video on Industry Leading VSX Video Communications Platform"; Apr. 26, 2005; 2 pages.

Tim Hewson, Cliff Mcknight, Anne Clarke, and Peter Marsh; "Video Communication"; Desktop Video AGOCG Report; Feb. 24, 1999; 48 pages.

Bill Birney and David Workman; "Determining the Shape of Pixels and Frames"; May 2003; 15 pages; Microsoft Corporation.

Paul Bourke; "YCC colour space and image compression"; Apr. 2000; 7 pages.

Fredo Durand and Julie Dorsey; "Fast Bilateral Filtering for the Display of High-Dynamic-Range Images"; International Conference on Computer Graphics and Interactive Techniques; 2002; pp. 257-266.

Armando Fox, Steven D. Gribble, Eric A. Brewer, and Elan Amir; "Adapting to Network and Client Variability via On-Demand Dynamic Distillation" Proceedings of the seventh international conference on Architectural support for programming languages and operating systems;1996; pp. 160-170.

Jefferson Han and Brian Smith; "CU-SeeMe VR Immersive Desktop Teleconferencing"; Proceeding of the Fourth ACM international conference on Multimedia; 1997; pp. 199-207.

Tohru Noshi, Kenjiro Mori, Yasuhiro Takahashi Yoshiyuki Nakayama, and Takeshi Ishizaki; "Bisdn Multimedia Communication and Collaboration Platform Using Advanced Video Workstations to Support Cooperative Work"; IEEE Journal on Selected Areas in Communications; Dec. 1992; pp. 1403-1412; vol. 10, No. 9.

A.B. Larsen and E.F. Brown; "'Continuous Presence' Video Conferencing at 1.5-6 Mb/sec"; Teleconferencing and Interactive Media, University of Wisconsin Extension Center for Interactive Programs; 1980; 8 pages.

D. Darian Muresan and Thomas M. Parks; "Optimal Recovery Demosaicing"; The IASTED Conference on Signal and Image Processing; 2002; 6 pages.

Roderick E. Perkins; "Spider: Investigation in Collaborative Technologies and Their Effects on Network Performance"; Global Telecommunications Conference; Dec. 1991; pp. 2074-2080; vol. 3.

Nicolas Roussel and Michel Beaudouin-Lafon; "VideoSpace: A Toolkit for Building Mediaspaces"; 1999; 11 pages.

Fred Sammartino and Dean Blackketter; "Desktop Multimedia Communications—Breaking the Chains"; 1991; 5 pages; Advanced Technology Group Apple Computer, Inc.

Scott R. Sharer; "What-Is 'HD'/'Hi-Def'"; Tandberg presentation; Aug. 2005; 43 pages.

Marc H. Willebeek-Lemair and Zon-Yin Shae; "Videoconferencing over Packet-Based Networks" IEEE Journal on Selected Ares in Communications; Aug. 1997; 1101-1114; vol. 15, No. 6.

"Polycom Executive Collection"; Jun. 2003; 4 pages; Polycom, Inc.; Pleasanton, CA.

Joe Duran and Charlie Sauer; "Mainstream Videoconferencing—A Developers Guide to Distance Multimedia"; Jan. 1997; pp. 149-150 Addison Wesley Longman, Inc.

Joe Duran and Charlie Sauer; "Mainstream Videoconferencing—A Developers Guide to Distance Multimedia"; Jan. 1997; pp. 228-230; Addison Wesley Longman, Inc.

* cited by examiner

TEMPORAL VIDEO FILTERING

PRIORITY

This application claims priority to U.S. Provisional Patent Application Ser. No. 60/751,152 titled "Temporal Filtering", which was filed Dec. 16, 2005, whose inventor is Michael V. Jenkins which is hereby incorporated by reference in its entirety as though fully and completely set forth herein.

BACKGROUND

1. Field of the Invention

The present invention relates generally to video and, more specifically, to video filtering.

2. Description of the Related Art

A video image may be displayed on a display using multiple Picture Elements (pixels). The number of possible shades for a pixel on the display may depend, in part, on the number of bits used for each pixel. For example, if 8 bits are used for each pixel, the pixel may have one of 256 (2^8) possible colors or shades of gray.

Each frame in a series of video frames (e.g., captured using a camera in a video conference) may include several pixels. Image elements with relatively no movement, such as the background, may have pixel values that stay fairly constant between each frame (e.g., the pixels representing the image element may not change very much between frames in a series of frames). Ideally, if the camera is still, and an object in the camera's field of view is not moving, the pixel values in the respective portions of the video frames in the series may be identical. However, noise (e.g., from different electronic sources, camera jitter, etc.), may cause pixels for non-moving objects to have different values between frames (noise may also affect the values of moving object pixels as well).

When transmitting and/or displaying the frames in series, the previous frame's pixel values (for pixels that are not moving) may be kept without needing to refresh their values. The transmission bandwidth for video frames may then be focused on transmitting moving pixels (or vectors representing changing values for a series of pixels). However, with noise, it may be difficult to determine which fluctuations are due to movement and which are due to noise. These fluctuations may need to be filtered.

SUMMARY OF THE INVENTION

In various embodiments, temporal filtering may be used to reduce noise over time in a series of video frames. A temporal filter may use previous filtered frames (or other frames such as previous unfiltered frames) to reduce the noise in a new frame. For example, a temporal filter may be used to filter noise in still parts of an image more strongly than in moving parts of the image.

In some embodiments, a temporal filter requiring less processing power may include a method for detecting motion between a set of pixels and applying the temporal filter based on the detected motion. For example, if substantial motion is not detected, the temporal filter for the block of pixels may be stronger (i.e., reduce more noise) than the temporal filter applied to a block of pixels for which substantial motion has been detected.

BRIEF DESCRIPTION OF THE DRAWINGS

A better understanding of the present invention may be obtained when the following detailed description is considered in conjunction with the following drawings, in which.

Figure 1:
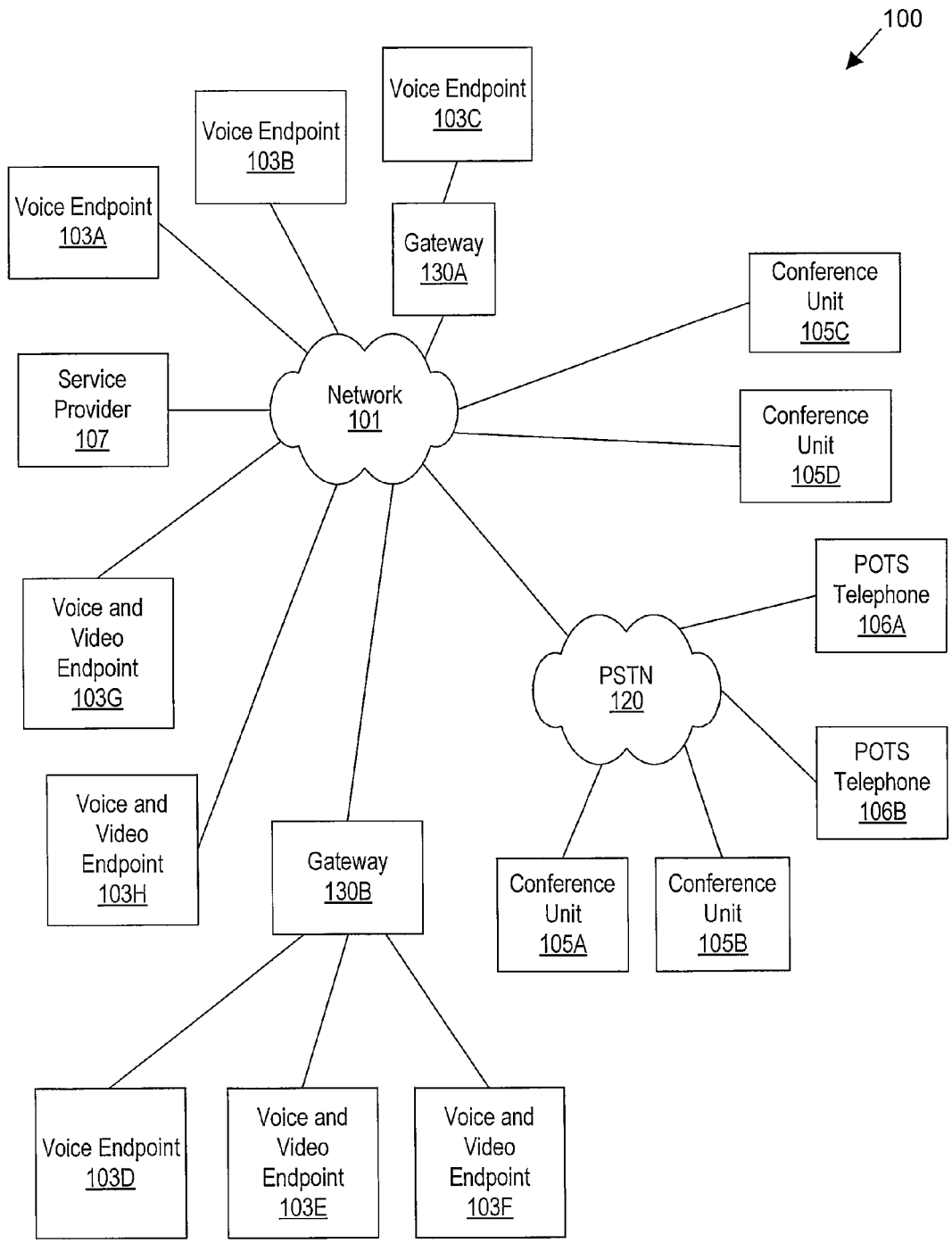
FIG. 1 illustrates a video conferencing system, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. patent application titled "Speakerphone", Ser. No. 11/251,084, which was filed Oct. 14, 2005, whose inventor is William V. Oxford is hereby incorporated by reference in its entirety as though fully and completely set forth herein.

U.S. Patent Application titled "Video Conferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

U.S. Patent Application titled "Speakerphone Supporting Video and Audio Features", Ser. No. 11/251,086, which was filed Oct. 14, 2005, whose inventors are Michael L. Kenoyer, Craig B. Malloy and Wayne E. Mock is hereby incorporated by reference in its entirety as though fully and completely set forth herein.

U.S. Patent Application titled "High Definition Camera Pan Tilt Mechanism", Ser. No. 11/251,083, which was filed Oct. 14, 2005, whose inventors are Michael L. Kenoyer, William V. Oxford, Patrick D. Vanderwilt, Hans-Christoph Haenlein, Branko Lukic and Jonathan I. Kaplan, is hereby incorporated by reference in its entirety as though fully and completely set forth herein.

FIG. 1 illustrates an embodiment of a videoconferencing system 100. Video conferencing system 100 comprises a plurality of participant locations or endpoints. FIG. 1 illustrates an exemplary embodiment of a videoconferencing system 100 which may include a network 101, endpoints 103A-103H (e.g., audio and/or video conferencing systems), gateways 130A-130B, a service provider 107 (e.g., a multipoint control unit (MCU)), a public switched telephone network (PSTN) 120, conference units 105A-105D, and plain old telephone system (POTS) telephones 106A-106B. Endpoints 103C and 103D-103H may be coupled to network 101 via gateways 130A and 130B, respectively, and gateways 130A and 130B may each include firewall, network address translation (NAT), packet filter, and/or proxy mechanisms, among others. Conference units 105A-105B and POTS telephones 106A-106B may be coupled to network 101 via PSTN 120. In some embodiments, conference units 105A-105B may each be coupled to PSTN 120 via an Integrated Services Digital Network (ISDN) connection, and each may include and/or implement H.320 capabilities. In various embodiments, video and audio conferencing may be implemented over various types of networked devices.

In some embodiments, endpoints 103A-103H, gateways 130A-130B, conference units 105C-105D, and service provider 107 may each include various wireless or wired communication devices that implement various types of communication, such as wired Ethernet, wireless Ethernet (e.g., IEEE 802.11), IEEE 802.16, paging logic, RF (radio frequency) communication logic, a modem, a digital subscriber line (DSL) device, a cable (television) modem, an ISDN device, an ATM (asynchronous transfer mode) device, a satellite transceiver device, a parallel or serial port bus interface, and/or other type of communication device or method.

In various embodiments, the methods and/or systems described may be used to implement connectivity between or among two or more participant locations or endpoints, each having voice and/or video devices (e.g., endpoints 103A-103H, conference units 105A-105D, POTS telephones 106A-106B, etc.) that communicate through various networks (e.g., network 101, PSTN 120, the Internet, etc.).

Endpoints 103A-103C may include voice conferencing capabilities and include or be coupled to various audio devices (e.g., microphones, audio input devices, speakers, audio output devices, telephones, speaker telephones, etc.). Endpoints 103D-103H may include voice and video communications capabilities (e.g., video conferencing capabilities) and include or be coupled to various audio devices (e.g., microphones, audio input devices, speakers, audio output devices, telephones, speaker telephones, etc.) and include or be coupled to various video devices (e.g., monitors, projectors, displays, televisions, video output devices, video input devices, cameras, etc.). In some embodiments, endpoints 103A-103H may comprise various ports for coupling to one or more devices (e.g., audio devices, video devices, etc.) and/or to one or more networks.

Conference units 105A-105D may include voice and/or video conferencing capabilities and include or be coupled to various audio devices (e.g., microphones, audio input devices, speakers, audio output devices, telephones, speaker telephones, etc.) and/or include or be coupled to various video devices (e.g., monitors, projectors, displays, televisions, video output devices, video input devices, cameras, etc.). In some embodiments, endpoints 103A-103H and/or conference units 105A-105D may include and/or implement various network media communication capabilities. For example, endpoints 103A-103H and/or conference units 105C-105D may each include and/or implement one or more real time protocols, e.g., session initiation protocol (SIP), H.261, H.263, H.264, H.323, among others. In some embodiments, endpoints 103A-103H may implement H.264 encoding for high definition video streams.

In various embodiments, a codec may implement a real time transmission protocol. In some embodiments, a codec (which may be short for "compressor/decompressor") may comprise any system and/or method for encoding and/or decoding (e.g., compressing and decompressing) data (e.g., audio and/or video data). For example, communication applications may use codecs to convert an analog signal to a digital signal for transmitting over various digital networks (e.g., network 101, PSTN 120, the Internet, etc.) and to convert a received digital signal to an analog signal. In various embodiments, codecs may be implemented in software, hardware, or a combination of both. Some codecs for computer video and/or audio may include Moving Picture Experts Group (MPEG), Indeo, and Cinepak, among others.

In some embodiments, at least one of the participant locations may include a camera for acquiring high resolution or high definition (e.g., HDTV compatible) signals. At least one of the participant locations may include a high definition display (e.g., an HDTV display), for displaying received video signals in a high definition format. In one embodiment, the network 101 may be 1.5 MB or less (e.g., T1 or less). In another embodiment, the network is 2 MB or less.

In some embodiments, the video conferencing system may support high definition capabilities. The term "high resolution" includes displays with resolution of 1280×720 pixels and higher. In one embodiment, high-definition resolution may comprise 1280×720 progressive scan at 60 frames per second, or 1920×1080 interlaced or 1920×1080 progressive. Thus, in one embodiment, a video conferencing system may support high definition "e.g. similar to HDTV" display capabilities using network infrastructures with bandwidths T1 capability or less. The term "high-definition" is intended to have the full breath of its ordinary meaning and includes "high resolution".

Figure 2:
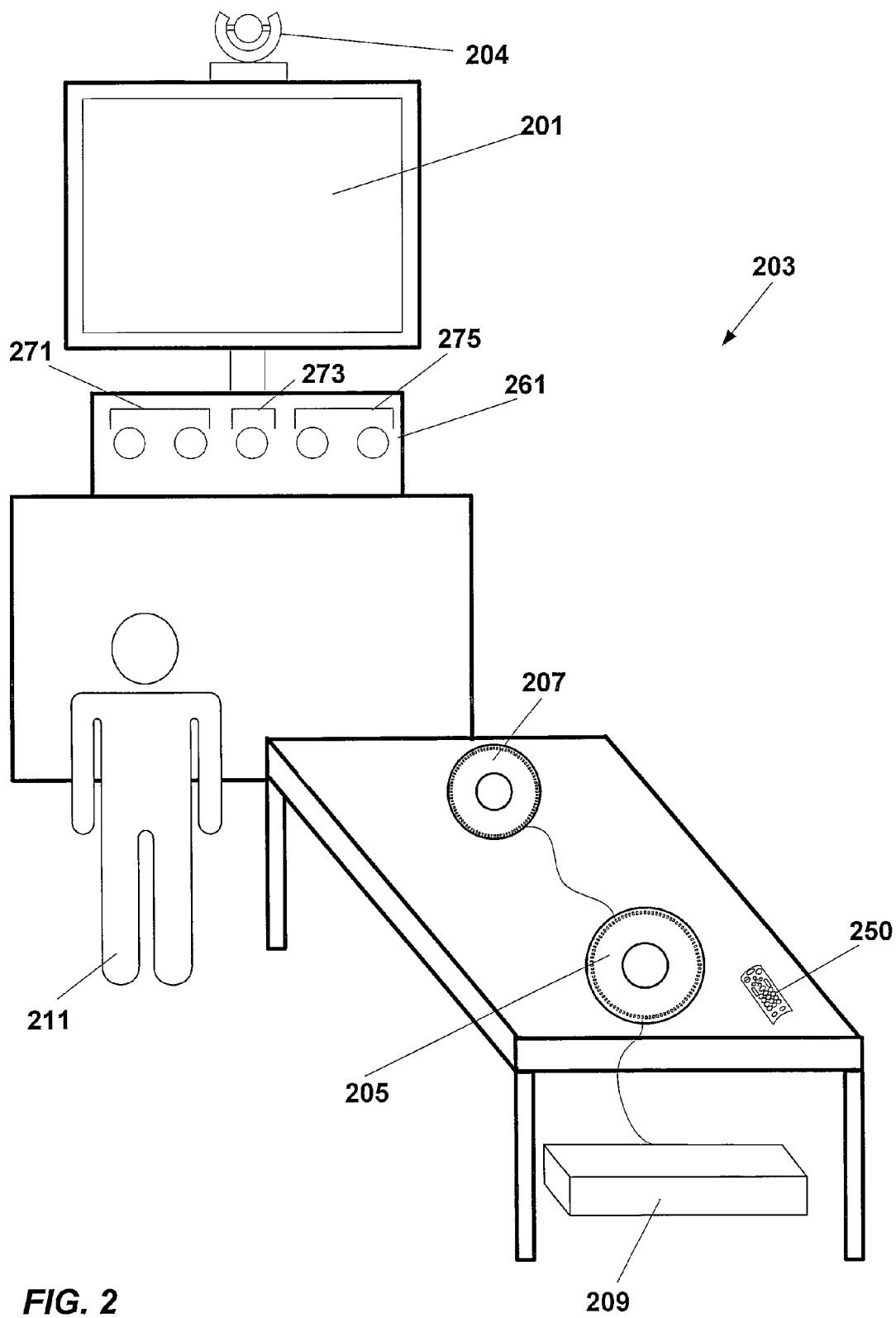
FIG. 2 illustrates a participant location or conferencing unit, according to an embodiment.

FIG. 2 illustrates an embodiment of a participant location, also referred to as an endpoint or conferencing unit (e.g., a video conferencing system). In some embodiments, the video conference system may have a system codec 209 to manage both a speakerphone 205/207 and a video conferencing system 203. For example, a speakerphone 205/207 and a video conferencing system 203 may be coupled to the integrated video and audio conferencing system codec 209 and may receive audio and/or video signals from the system codec 209. In some embodiments, speakerphones 205/207 may be daisy chained together.

In some embodiments, the speakerphone 205/207 may be a high quality speakerphone. For example, in some embodiments, 16 microphones may be radially distributed around a center speaker. Other numbers of microphones and speakers may also be used. The microphones may be radially distributed to enhance detection of an in-room participant's voice from multiple angles relative to the speakerphone 205/207.

In some embodiments, the participant location may include a high definition camera 204 for acquiring high definition images of the participant location. The participant location may also include a high definition display 201 (e.g., a HDTV display). High definition images acquired by the camera may be displayed locally on the display and may also be encoded and transmitted to other participant locations in the videoconference. In some embodiments, data from camera may be provided to the video conferencing system through a digital link from the camera. The data may be processed external to the camera (e.g., with the logic of the system codec 209). In some embodiments, the data may be processed inside the camera.

The participant location may also include a sound system 261. The sound system 261 may include multiple speakers including left speakers 271, center speaker 273, and right speakers 275. Other numbers of speakers and other speaker configurations may also be used.

The video conferencing system components (e.g., the camera 204, display 201, sound system 261, and speakerphones 205/207) may be coupled to a system codec 209. The system codec 209 may receive audio and/or video data from a network. The system codec 209 may send the audio to the speakerphone 205/207 and/or sound system 261 and the video to the display 201. The received video may be high definition video that is displayed on the high definition display. The system codec 209 may also receive video data from the camera 204 and audio data from the speakerphones 205/207 and transmit the video and/or audio data over the network to another conferencing system. In some embodiments, the conferencing system may be controlled by a participant 211 through the user input components (e.g., buttons) on the speakerphone 205/207 and/or remote control 250. Other system interfaces may also be used.

In some embodiments, temporal filtering may be used to reduce noise over time in a series of video frames. A temporal filter may use previous filtered frames (or other frames) to reduce the noise in a new frame. In some embodiments, the temporal filter may filter noise in still parts of an image more strongly than in moving parts of the image.

Figures 3A, 3B:
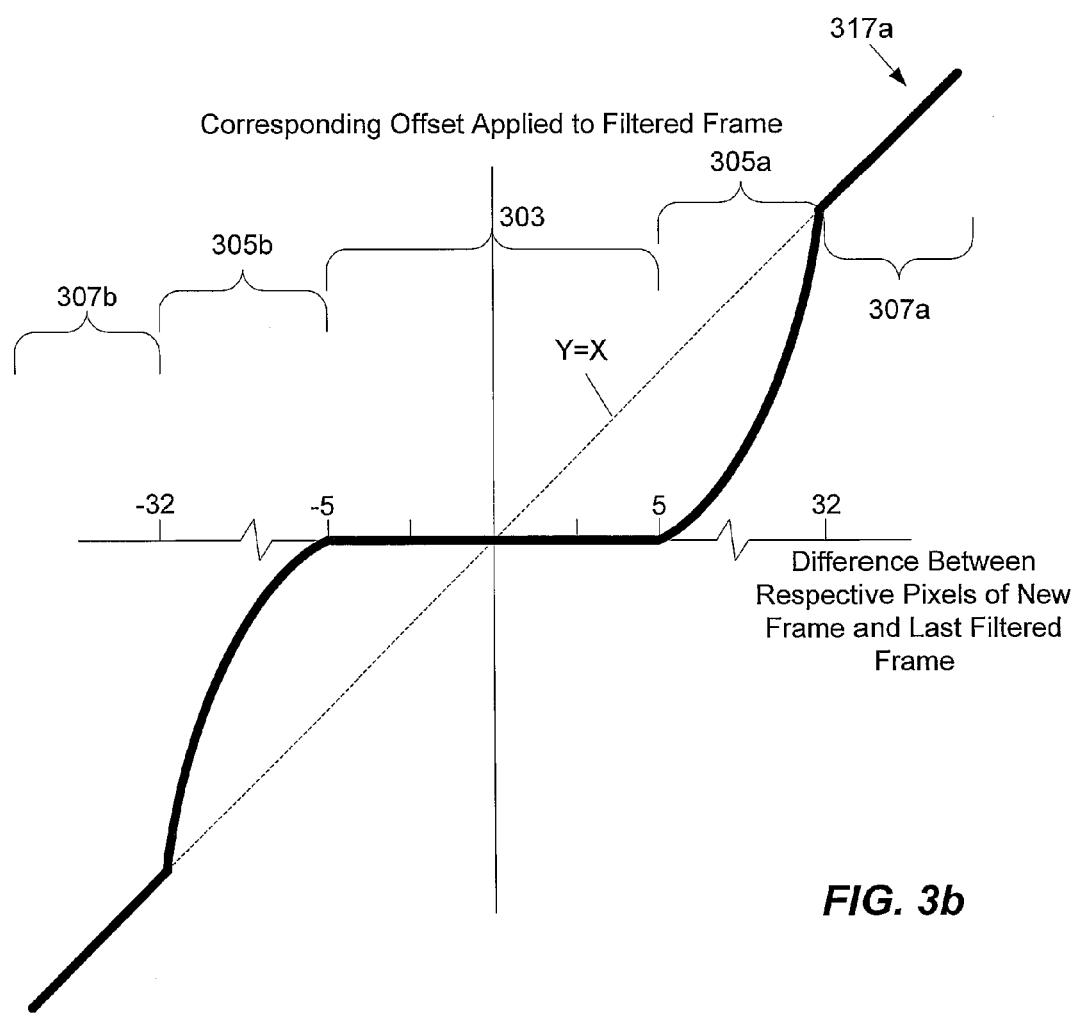
FIGS. 3a-e illustrate various distributions for temporal filtering.

As seen in FIG. 3a, no filtering may result in a one-to-one correlation between the input frame (the new frame) (e.g., a frame of data received from the camera) and the resultant frame.

As seen in FIG. 3b, a modified temporal filter may be applied to remove noise from the new frame resulting in a filtered frame. The temporal filter may compare the new frame and a previous filtered frame (or another previous filtered frame, an otherwise modified previous frame, or an unmodified previous new frame). For example, corresponding blocks of pixels may be compared between the new frame and the previous filtered frame. In some embodiments, an average frame calculated from averaging multiple previous frames (e.g., previous filtered frames, otherwise modified previous frames, or unmodified previous new frames) may be used to compare with the new frame. In some embodiments, weighted averages of multiple previous frames may be used. Weights applied may vary. For example, the previous filtered frame may be weighted forty percent, and each of the three filtered frames prior to the previous filtered frame may be weighted twenty percent. The resulting weighted frame values may be added together to form a weighted filtered frame to be compared to the new frame data. Other weights and distributions of weights are also contemplated. For example, in some embodiments, only the previous two filtered frames may be used (each weighted at fifty percent).

In some embodiments, the new frame and the previous filtered frame (or other frame such as the average frame or weighted filtered frame) may be compared pixel by pixel. In some embodiments, groups of corresponding pixels may be compared between the frames. For example, groups of three pixels from each frame may be added together and compared to corresponding sums between frames. Other numbers of pixels may also be used. As used herein, "pixel" refers to a numerical value of a pixel (and/or subpixel) (e.g., "pixel" may be used to refer to an integer value assigned to the red subpixel component of a pixel comprised of three subpixels). In some embodiments, subpixels may be processed as pixels. In some embodiments, groups of three pixels may be averaged (e.g., added together and divided by three) for the comparison with corresponding averaged pixels. Other methods of combining pixels for comparisons are also contemplated (e.g., weighted averages, etc.). In some embodiments, the comparison may include calculating a difference between corresponding pixels (or an average, sum, etc. of the pixels) of the new frame and the previous filtered frame. In some embodiments, a difference may be calculated between a subset (e.g., a three by three block of nine pixels) of corresponding pixels from the new frame and the previous filtered frame. Corresponding pixels may be in a similar location (e.g., with respect to the frame boundaries) on the new frame and the previous filtered frame. In some embodiments, the comparison may include calculating a difference between corresponding pixels (or an average, sum, etc. of the pixels) of the new frame and another previous filtered frame, an otherwise modified previous frame, or an unmodified previous new frame.

In some embodiments, the comparison may be used to construct the new filtered frame. FIG. 3b illustrates an embodiment of a difference distribution line 317a to apply to pixels of a frame to produce a filtered frame. In some embodiments, the x-axis may represent the difference in value between a pixel on the new frame and a respective pixel on the previous filtered frame (or average difference of groups of corresponding pixels, etc.). The difference distribution line 317a may also be used for other comparisons (e.g., differences between averaged or weighted frames). The y-axis may represent the corresponding offset applied to (e.g., added to) a pixel or group of pixels of the previous filtered frame (or other frame) to produce the next frame (i.e., the next filtered frame). In some embodiments, the corresponding offset (y-axis) of the difference distribution line 317a (corresponding to the difference on the x-axis) may be applied to the new frame to produce the next filtered frame. In some embodiments, the corresponding offset may be applied to an average or weighted average of several frames (e.g., previous filtered frames or previous unmodified frames) to produce the next filtered frame.

As seen in FIG. 3b, in some embodiments, if the difference between a pixel of the new frame and a corresponding pixel of the previous filtered frame (or the difference between averaged pixels, summed pixels, etc.) is between a range of thresholds (e.g., approximately −5 and 5), a corresponding offset of 0 (or another small offset value) may be added to the corresponding pixel of the previous filtered frame (or other frame used in the comparison) to produce the new frame (e.g., new filtered frame) pixel (e.g., see region 303 of line 317a). Because the difference may be relatively small, the difference may be assumed to be primarily associated with noise. Therefore, the 0 (or small offset value) may be added to the corresponding previous filtered frame pixel instead of using the corresponding new frame pixel to effectively eliminate the effect of noise on the corresponding new frame pixel. In some embodiments, "adding" may include directly increasing or decreasing the value of the pixel by the offset value or in some other way affecting the value of the pixel to effectively increase or decrease the value of the pixel by the offset value. For example, the pixel may be divided by a number (e.g., a number between 1 and 0) that results in a new value that is effectively the value of the pixel increased by the offset. Other ways of affecting the value of the pixel are also contemplated.

In some embodiments, 0 may be added to each pixel of a corresponding group of pixels (e.g., which were added or averaged for the comparison). In some embodiments, 0 may be added to a subset of the corresponding group of pixels (e.g., applied to the center pixel in a group of three by three corresponding pixels). As used herein, "subset" may refer to a single element in a set. In some embodiments, 0 may be added to a corresponding pixel (or group of pixels) on the previous unmodified frame (i.e., previous new frame) to produce the new filtered frame. Modifying pixels or groups of pixels on other types of frames to produce the filtered frame are also possible. In some embodiments, an offset value may be averaged with, for example, the corresponding pixel of the previous filtered frame instead of (or in addition to) adding an offset value (e.g., 0) to the corresponding pixels. Other modifications are also contemplated (e.g., subtracted from, divided by, etc.).

Other values for the thresholds and offsets are also contemplated. The threshold may be dependent, for example, on the type of sensor used to capture the image data. For example, −5 to 5 may be used for Micron™ CMOS sensors (Complementary Metal-Oxide Semiconductor sensors) and a 10-bit pixel space. Other threshold values may also be used for Micron™ CMOS sensors (for example, region 303 may be expanded to extend between −10 and +10). Other sensors may also be used. For example, Atlasens™ sensors may be used (and may have a wider threshold, for example, if the sensors produce more noise than Micron™ sensors). The threshold values may also be dependent on the type of space used for the pixels. For example, if the image uses 8 bits per pixel, the pixel space may extend from 0 to 255, and if the image uses 10 bits per pixel, the pixel space may extend from 0 to 1023 (which may result in larger corresponding thresholds than the 8 bit pixel space thresholds).

In some embodiments, the size of region 303 (or the thresholds defining region 303) or other regions of the difference distribution line 317a may be a predetermined value(s) entered by a user of, for example, a video conferencing system. In some embodiments, the size of the region 303 may be dependent on noise detected between the frames.

In some embodiments, at large differences, e.g., at the exterior regions 307a,b of the difference distribution line 317a, the difference between a pixel (or group of pixels) of the new frame and a corresponding pixel (or group of pixels) of the previous filtered frame (or other frame(s)) may be added to the respective pixel of the previous filtered frame (or other frame(s)). This may result in a value approximately equal to the pixel value of the new frame pixel. In the case of a relatively large difference, the difference may be primarily associated with movement. To capture the movement, the difference (or a substantial portion of the difference) may be allowed to carry over to the corresponding pixel of the new filtered frame. In some embodiments, the new frame pixel may be used instead of adding the corresponding difference (e.g., when the difference exceeds a threshold). Other modifications are also contemplated (e.g., averaging, subtracted from, divided by, etc.). In some embodiments, the threshold may be user defined.

Figure 3C:
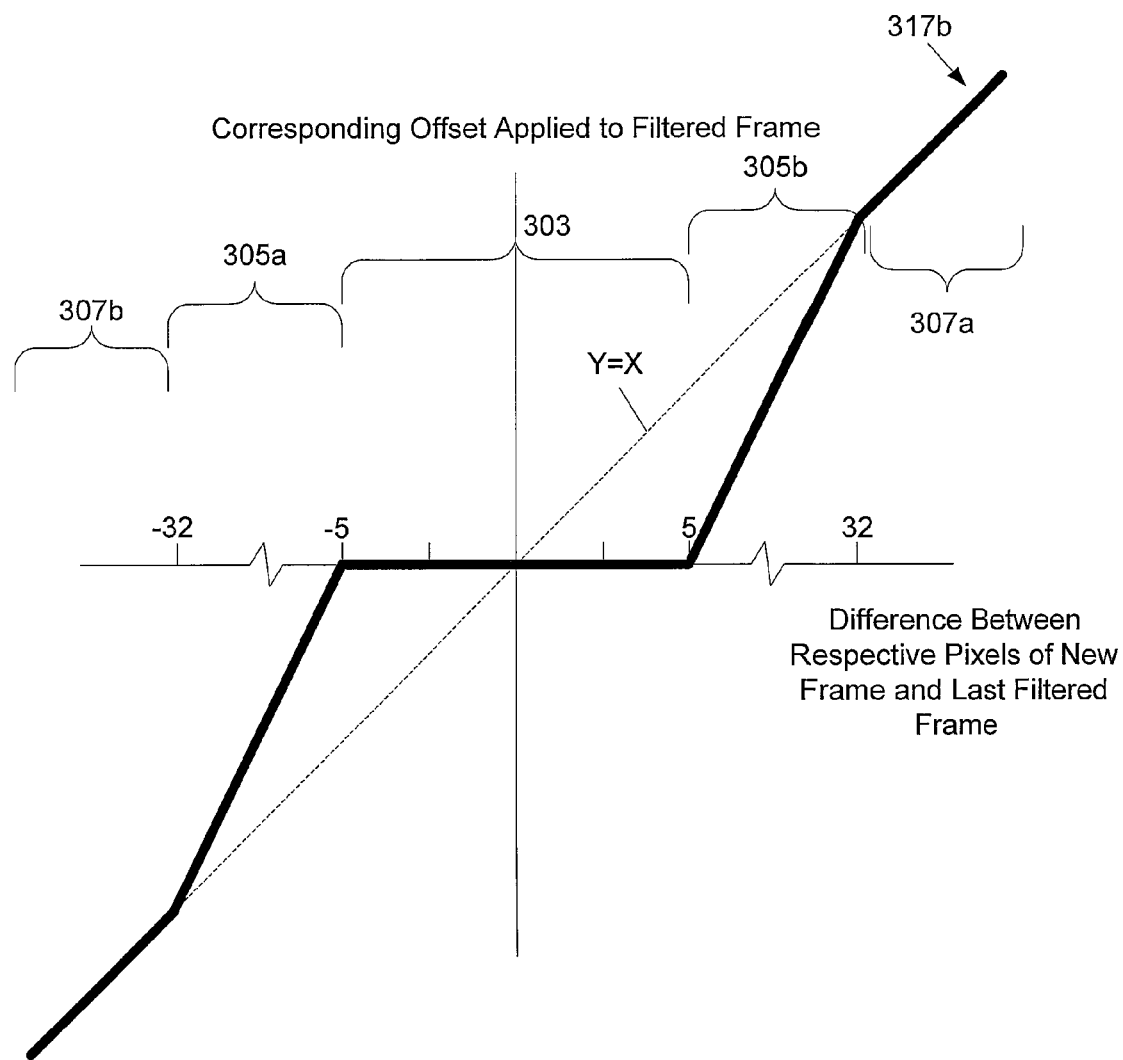
Figure 3D:
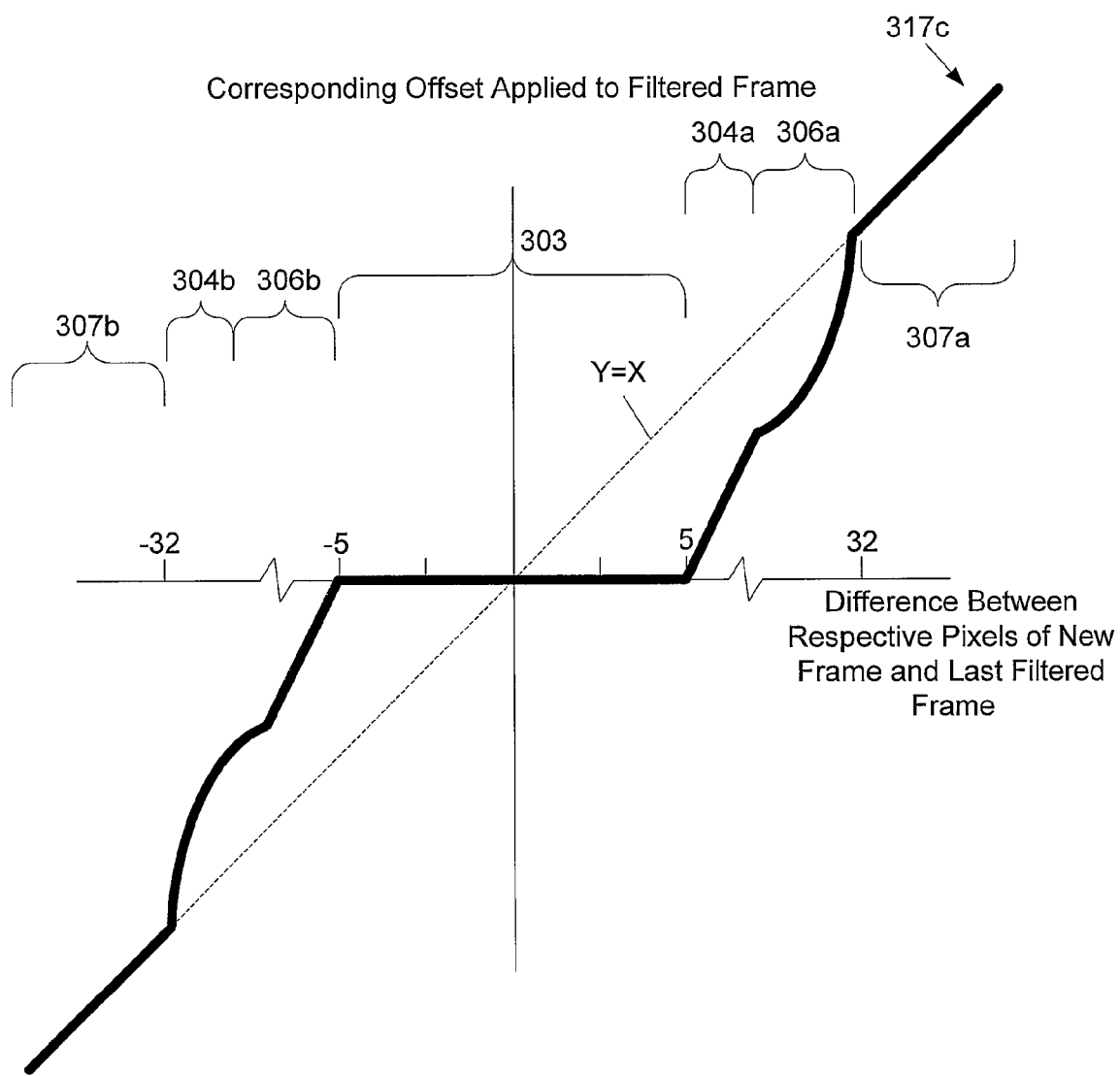

In some embodiments, a non-linear region 305a,b may be used between region 303 and regions 307a,b. For example, region 305a may extend between 5 and 32 for a 10-bit pixel space. Other thresholds are also contemplated. These thresholds may also depend on the type of sensors used and the type of space used for the pixel values. In some embodiments, region 305a,b may be linear (e.g., see regions 305a,b of difference distribution line 317b in FIG. 3c). Other region sizes and shapes are also contemplated. In some embodiments, other numbers of regions may also be used. For example, as seen in FIG. 3d, linear regions 304a,b and non-linear regions 306a,b may be used. The difference between the corresponding pixels (or groups of pixels) on the x-axis may be used to determine the associated corresponding difference on the y-axis (e.g., through difference distribution lines 317a,b,c) to apply (e.g., added to the previous filtered frame) to produce the new filtered frame.

In some embodiments, the non-linear region (e.g., regions 305a,b) (and/or other regions of the filter) may be provided by one or more look-up tables with corresponding values of differences (x) and offsets (y). For example, these tables may provide a digital orientation to emulate an Infinite Impulse Response (IIR) filter for this region. The look-up tables may represent different shapes that may be used to provide different types of filtering. For example, in some embodiments, a look-up table may be used to provide an offset that increasingly recognizes the difference as movement. In some embodiments, the non-linear portion may instead minimize the difference applied (e.g., to provide a stronger noise filter). Other tables are also contemplated. In some embodiments, the tables may be calculated through trial and error. In some embodiments, the tables may be derived using different formulas. In some embodiments, the non-linear region may be represented by a function (e.g., $y=(0.032*x^2)-0.8$). Other functions are also contemplated. Other shapes of the non-linear filter are also contemplated.

In some embodiments, region 303 may represent a noise region. If the difference between the new pixel value and the respective filtered pixel value is in region 303, it may be attributed to noise and may be filtered out (e.g., by effectively adding 0 to the previous filtered pixel value). As the difference increases (and correspondingly the portion of the difference attributable to noise decreases), the new pixel value may be given more weight (e.g., see regions 307a,b). In some embodiments, at relatively large differences, the new pixel value may become the next filtered pixel value (e.g., by adding the respective difference to the previous filtered pixel to effectively use the new pixel or by using the new pixel.)

In some embodiments, all or a substantial portion of the difference distribution line (e.g., difference distribution line 317d in FIG. 3e) may be based on a continuous function instead of including separate regions. For example, $y=(x^3)/(A+x^2)$ (also corresponding offset=difference$^3$/(A+difference$^2$)) may be used as a filter. In some embodiments, A may equal 1 or another number (e.g., the larger A is, the flatter the difference distribution line 317d may be near the origin). Other functions are also contemplated.

As seen in FIGS. 4a-d, in some embodiments, a temporal filter requiring less processing power may include a method for detecting motion between a set of pixels and applying the temporal filter based on the detected motion. For example, if substantial motion is not detected (e.g., as between old block 451 in old filtered frame 401 and new block 453 in new frame 403 in FIG. 4a), the temporal filter for the block of pixels may be stronger (e.g., to reduce more noise) than the temporal filter applied to a block of pixels for which substantial motion has been detected (e.g., as between old block 451 in old filtered frame 401 and new block 457 in new frame 405 in FIG. 4b).

In some embodiments, to detect motion between frames, the values of the previous filtered set of pixels 401 (e.g., O) may be subtracted from the values of the corresponding pixels in the new frame set of pixels 403 (e.g., N) and the respective differences may be summed together into a resultant. For example, a resultant for respective blocks of nine elements:

$$\sum_{\substack{X=X_O-1 \\ Y=Y_O-1}}^{\substack{Y_O+1 \\ X_O+1}} (N_{XY} - O_{XY}) = \text{Resultant Sum}$$

Other methods for determining the resultant are also contemplated. For example, weighted values may be compared or other pixel sets may be brought into the equation (e.g., the old unfiltered set of pixels, etc., may be used to create equations that provide different resultants). In some embodiments a first running average (e.g., calculated average of the past several new data frames) may be used. A second running average (e.g., calculated average of the past several filtered frames) may also be used. For example, differences between pixels of the first running average and the second running average may be summed to determine the resultant sum.

In some embodiments, if the resultant is small, the difference between the sets may be primarily the result of noise. In this case, there may be little or no motion and the resultant (divided by the number of pixels in a set) may approximately equal the noise:

$$\frac{\sum_{\substack{X=X_O-1 \\ Y=Y_O-1}}^{\substack{Y_O+1 \\ X_O+1}} (N_{XY} - O_{XY})}{\text{Number\_of\_pixels\_in\_block}} \approx \text{Noise}$$

In some embodiments, more motion may mean a larger resultant (e.g., because of larger differences between the corresponding pixels). If some or all of the pixels are moving, the resultant may be very large (because movement may result in a large correlated resultant).

In some embodiments, if the resultant is large, a weaker temporal filter (e.g., with a smaller noise region 303) may be applied. In some embodiments, no filtering may be applied. If the resultant is not large, a stronger filter may be applied (e.g., with a larger region 303). In some embodiments, the resultant may be compared to various thresholds to determine whether to use a strong or weak temporal filter (or to not use a temporal filter).

In some embodiments, the size of the resultant may be used to determine whether to apply the filter to one or more pixels of the set of pixels. For example, the resultant may be calculated for a block of pixels and compared to a resultant range of thresholds. In some embodiments, the filter may be applied if the resultant is approximately in a resultant range of thresholds of −32 to 32 (e.g., for a block of 9 pixels in 10 bit pixel space). Other ranges are also contemplated (e.g., different ranges for different sensors, different sensitivity, different numbers of pixels used to calculate the resultant, different pixel spaces, etc.). The central limit theorem suggests that if the camera noise is Gaussian and there is no real movement in the pixels in question, the sum of the differences of nine pixels would be approximately one third the difference calculated for any single pixel in the group. In some embodiments, the sum of the differences may be greater or smaller. For example, motion may result in a large resultant.

In some embodiments, if the resultant indicates filtering should be applied, all or a subset of all of the pixels (e.g., only the center pixel) in the set of pixels may be filtered. For example, a resultant may be calculated for a block of 9 pixels (e.g., see FIG. 4a), and, if the resultant is in the range determined for filtering, the filter (e.g., as seen in FIG. 3b) may be applied to the center pixel of the block of 9 pixels. For example, the range determined for filtering may be approximately −32 to 32. Other ranges are also contemplated (e.g., dependent on numbers of pixels, pixel space, etc.). In some embodiments, the system may then move over one pixel from the center pixel and calculate a new resultant for the new set of 9 pixels (with the center pixel one pixel over from the previous center pixel). This resultant may then be used to determine whether to filter the new center pixel. In some embodiments, the perimeter pixels of the image may be a fixed number (e.g., 0 for all frames) and the filtering may start on the second row, second column of image pixels (in the 9 pixel embodiment). Other pixel blocks and starting points are also contemplated.

In some embodiments, the resultant may be used to weight the temporal filter to affect the strength of the filter. For example, the size of region 303 may be proportional to the size of the resultant. In some embodiments, the resultant may also be used to weight other regions, e.g., non-linear regions 305a,b. For example, the resultant may be used to determine which table and/or equations to use for non-linear region 305a,b (and/or other regions). In some embodiments, the resultant may be used to weight A (provided with respect to the function illustrated in FIG. 3e above) to affect the strength of the filter.

Figure 4A:
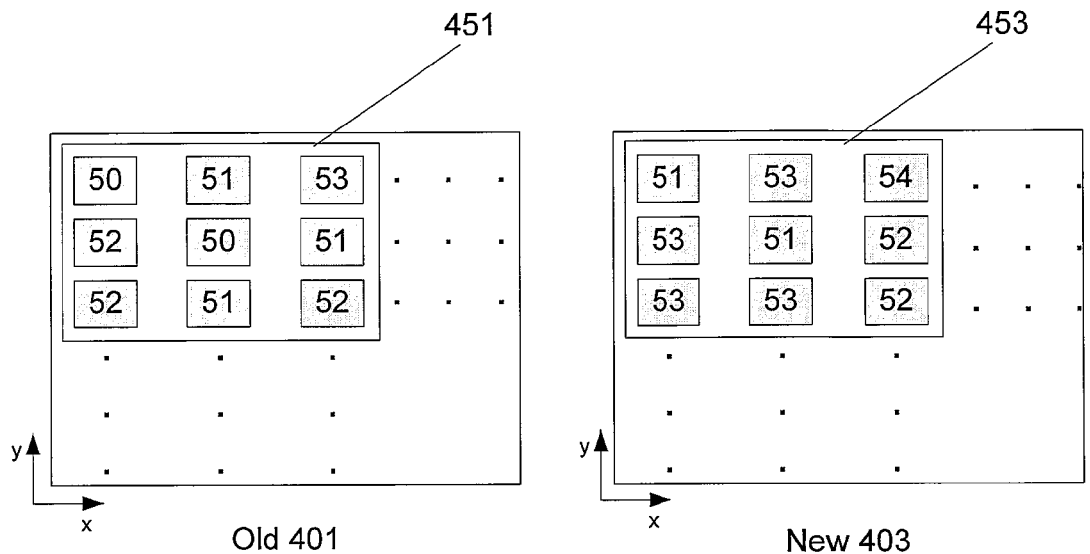
FIGS. 4a-d illustrate comparisons of various pixel sets, according to an embodiment.
Figure 4B:
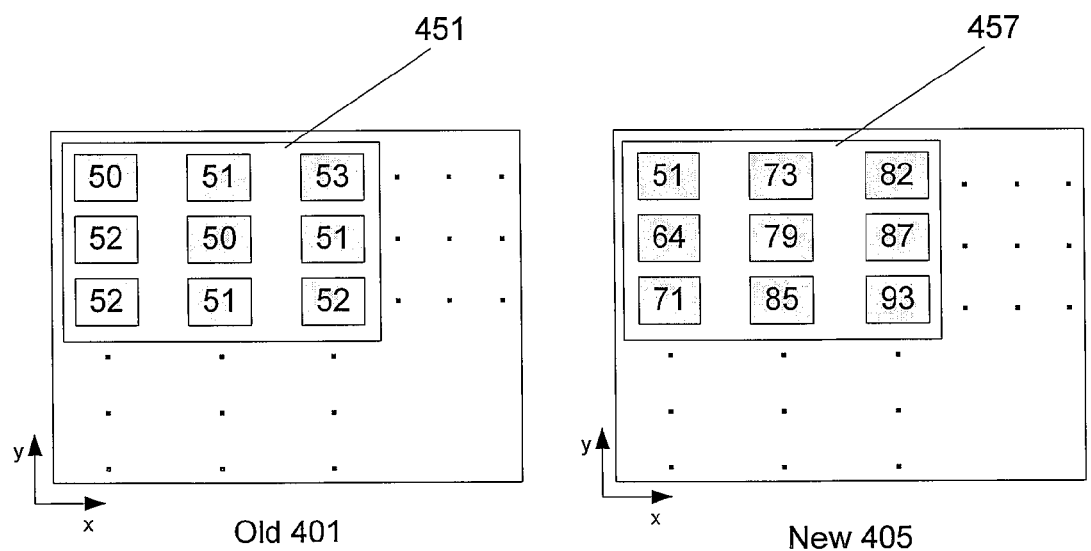
Figure 4C:
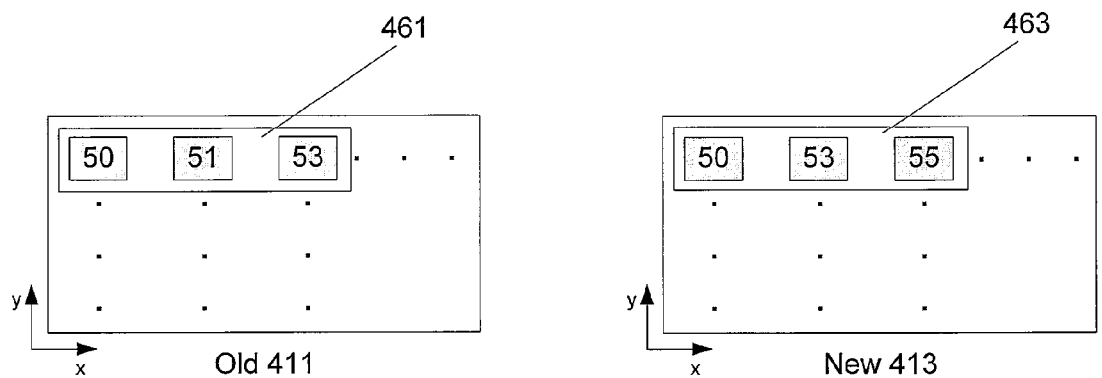
Figure 4D:
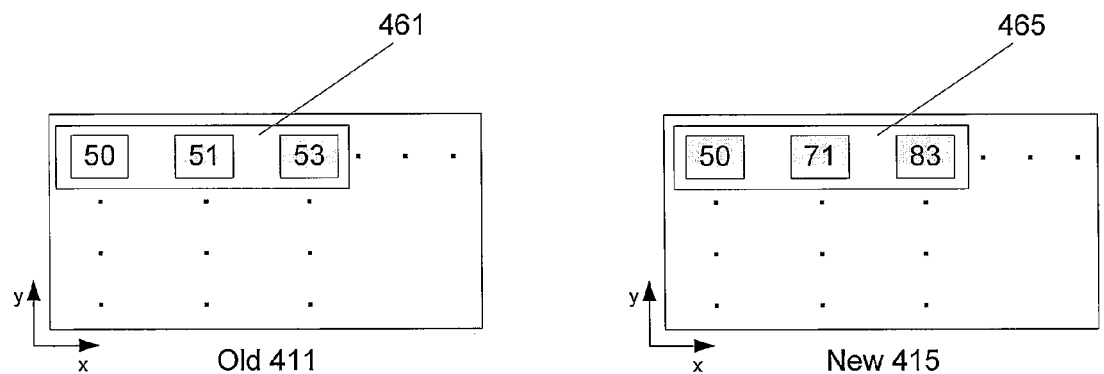

As seen in FIGS. 4a-b, 9-pixel blocks (e.g., blocks 451 and 453) may be used as the set of pixels. Other numbers of pixels and configurations may also be used as the pixel set. For example, as seen in FIGS. 4c-d, rows of three pixels (e.g., blocks 461 and 463) may be used as a set for the comparison. FIG. 4c illustrates an old block set 411 and a new block set 413 with relatively close values between blocks 461 and 463. FIG. 4d illustrates an old block set 411 and a new block set 415 that show relatively large differences between blocks 461 and 465. Although, in other embodiments, the differences shown between old block set 411 and new block set 415 may be relatively small. In some embodiments, the resultant, e.g., as determined by the comparison of the block sets, may be used, for example, to determine whether to use the temporal filter and/or to weight the temporal filter applied to each of the pixels (or a subset of pixels) in the set to form the new filtered frame. In some embodiments, the weight applied to the temporal filter may be modified between pixels in the set (e.g., may be weighted according to the difference between respective pixel values). In some embodiments, the resultant may be used to indicate whether to use the temporal filter, and the temporal filter may be applied as determined to the central pixel of the 9-pixel block (e.g., using the filter shown in FIG. 3b and the difference between the central pixel of the new frame and the corresponding central pixel of the previous filtered frame).

Figure 5:
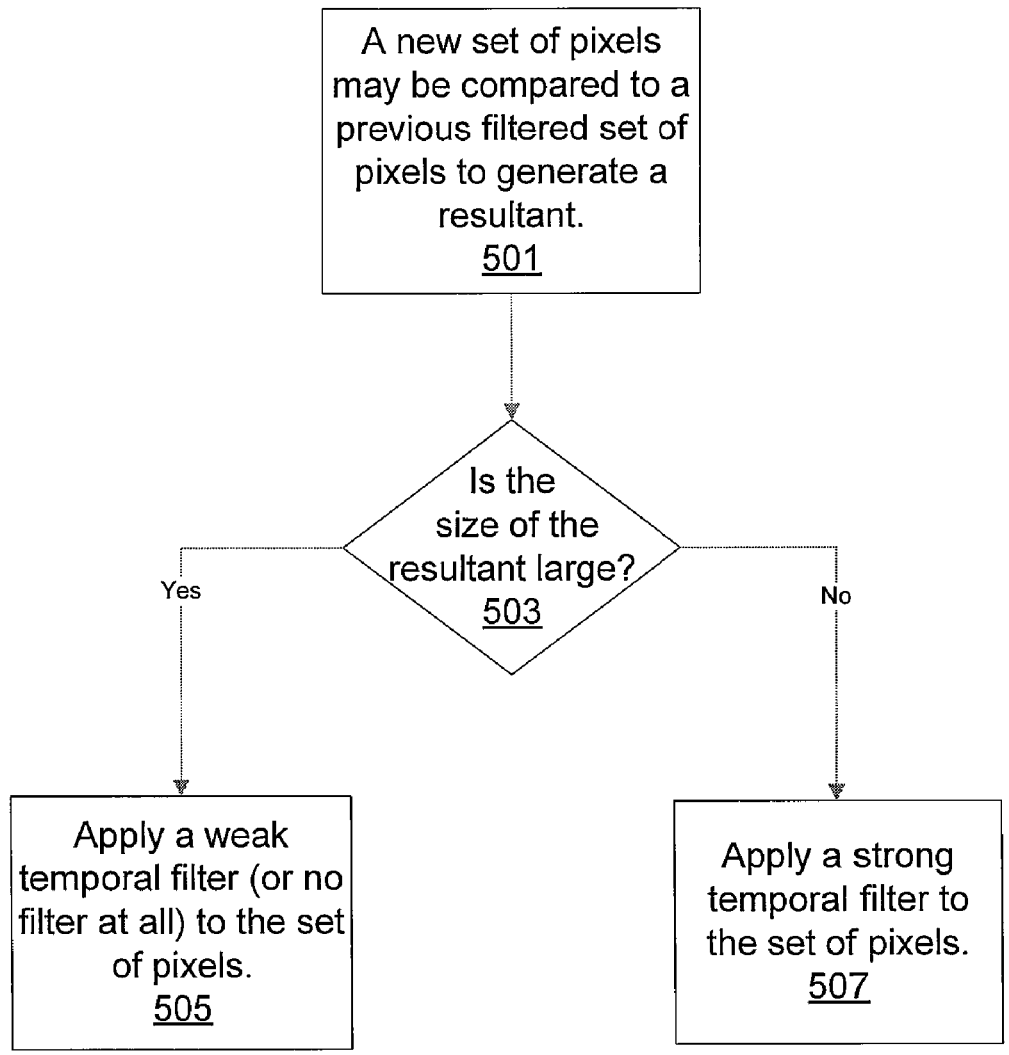
FIG. 5 illustrates a method for temporal filtering, according to an embodiment.

FIG. 5 illustrates a method for temporal filtering, according to an embodiment. It should be noted that in various embodiments of the methods described below, one or more of the elements described may be performed concurrently, in a different order than shown, or may be omitted entirely. Other additional elements may also be performed as desired.

At 501, a new set of pixels may be compared to a previous filtered set of pixels (or other source of pixels) to generate a resultant. In some embodiments, the differences between the values of the previous filtered set of pixels and the values of the corresponding pixels in the new set of pixels may be determined and the respective differences summed together into a resultant. For example, the values of the previous filtered set of pixels may be subtracted from the values of the corresponding pixels in the new set of pixels to determine the difference (or vice versa). In some embodiments, the absolute value of the differences may be used.

At 503, a determination may be made as to whether the resultant is large. For example, in some embodiments, the resultant may be compared to a threshold.

At 505, if the resultant is large, a weak temporal filter (or no filter at all) may be applied to the set of pixels (or subset of the pixels, for example, from the new frame or previous filtered frame). In some embodiments, the resultant may be factored into a temporal filtering equation to affect the strength of the temporal filtering. For example, difference distribution line (e.g., as seen in FIG. 3b-d) may be weighted accordingly and applied to the new set of pixels (or subset of the pixels) to produce the new filtered pixels. In some embodiments, the resultant may be used with a look-up table to determine weights and other values for the difference distribution line to apply to the pixels.

At 507, if the resultant is small, a strong temporal filter may be applied to the set of pixels (or a subset of the pixels). In some embodiments, applying a strong temporal filter may include extending region 303 (other regions may also be modified). This may result in minimizing more noise on the new frame.

Figure 6:
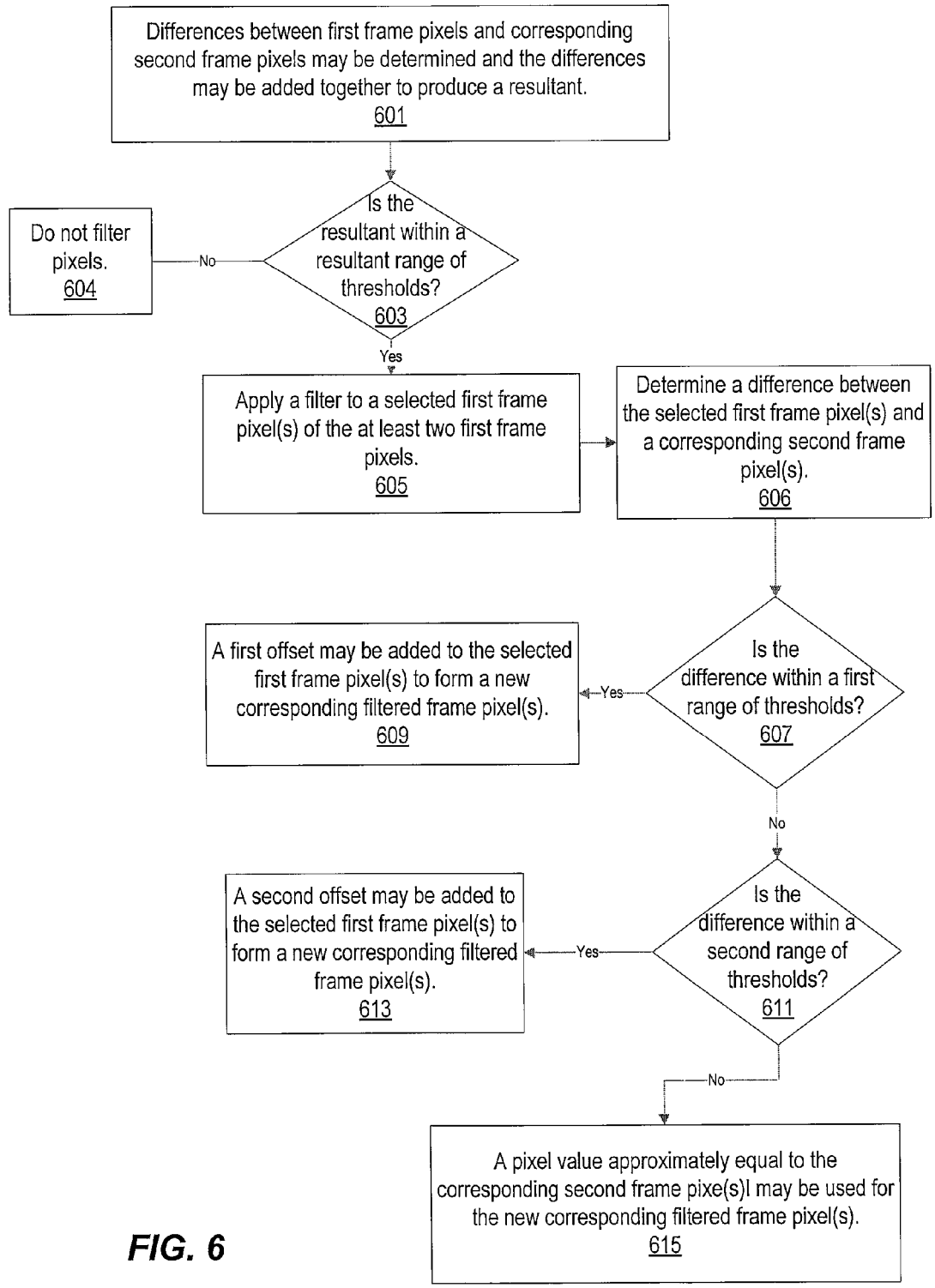
FIG. 6 illustrates a method for temporal filtering using various thresholds, according to an embodiment.

FIG. 6 illustrates a method for temporal filtering using various thresholds, according to an embodiment. It should be noted that in various embodiments of the methods described below, one or more of the elements described may be performed concurrently, in a different order than shown, or may be omitted entirely. Other additional elements may also be performed as desired.

At 601, differences between each of at least two first frame pixels and two corresponding second frame pixels may be determined and the differences may be added together to produce a resultant. In some embodiments, the first frame pixels may be from a previous filtered frame corresponding to the new frame (or another previous filtered frame, an otherwise modified previous frame, or an unmodified previous new frame). In some embodiments, the second frame pixels may be from the new frame. In some embodiments, the first frame pixels may be from the new frame and the second frame pixels may be from the previous filtered frame.

In some embodiments, the differences may be determined by subtracting the first frame pixels from the second frame pixels (or vice versa). In some embodiments, the difference may be determined by dividing the first frame pixels by the second frame pixels (or vice-versa) and using the results to indicate differences (e.g., the further the result is from 1, the further the first frame pixel magnitude may be from the second frame pixel magnitude, etc.). Other methods for determining a difference between the first frame pixels and the second frame pixels may also be used. The differences may be added together to form the resultant. In some embodiments, other operations may also be performed on the resultant (e.g., the resultant may be divided by the number of pixels used to determine the resultant).

At 603, a determination may be made as to whether the resultant is within a resultant range of thresholds. The resultant range of thresholds may depend on how the resultant was calculated, how sensitive the filter should be, etc. At 604, if the resultant is not within the resultant range of thresholds, a filter may not be applied.

At 605, if the resultant is within the resultant range of thresholds, a filter may be applied to a selected first frame pixel of the at least two first frame pixels (e.g., as provided below).

At 606, a difference between the selected first frame pixel(s) of the at least two first frame pixels and a corresponding second frame pixel(s) of the at least two corresponding second frame pixels may be determined. For example, the at least two first frame pixels may include a three by three block of nine pixels and the selected first frame pixel may include the central pixel.

Figure 3E:
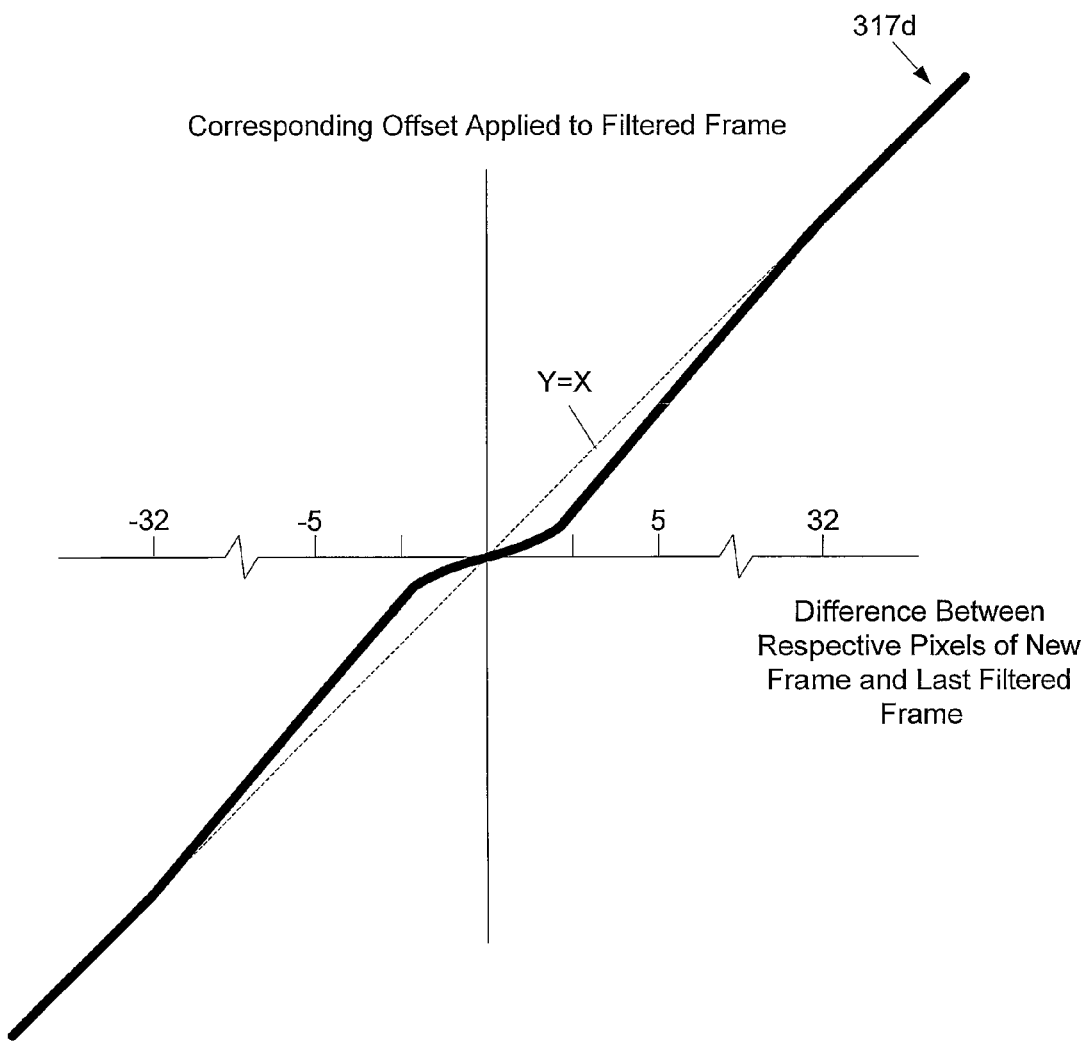

At 607, a determination may be made as to whether the difference is within a first range of thresholds (e.g., see region 303 of FIG. 3*b*). In some embodiments, a filter (e.g., as seen in FIG. 3*e*) may be applied using the calculated difference without determining if the difference is within the first range of thresholds.

At 609, if the difference is within the first range of thresholds, a first offset may be added to the selected first frame pixel(s) of the at least two first frame pixels to form the new corresponding filtered frame pixel(s). For example, the first offset may be approximately 0.

At 611, if the difference is not within the first range of thresholds, a determination may be made as to whether the difference is within a second range of thresholds.

At 613, if the difference is within the second range of thresholds, a second offset may be added to the selected first frame pixel(s) to form the new corresponding filtered frame pixel(s). In some embodiments, the second offset may be determined from a non-linear function based on the difference (e.g., see region 305*a* of FIG. 3*b*).

At 615, if the difference is not within the first range of thresholds and the difference is not within the second range of thresholds, a pixel value approximately equal to the corresponding second frame pixel(s) may be used for the filtered frame pixel(s). In some embodiments, a value approximately equal to the difference may be added to the first frame pixel(s) to form the new corresponding filtered frame pixel(s). In some embodiments, the corresponding second frame pixels may be used as the new corresponding filtered frame pixels instead of adding the respective differences (if the differences are not within the first or second range of thresholds).

Figure 7:
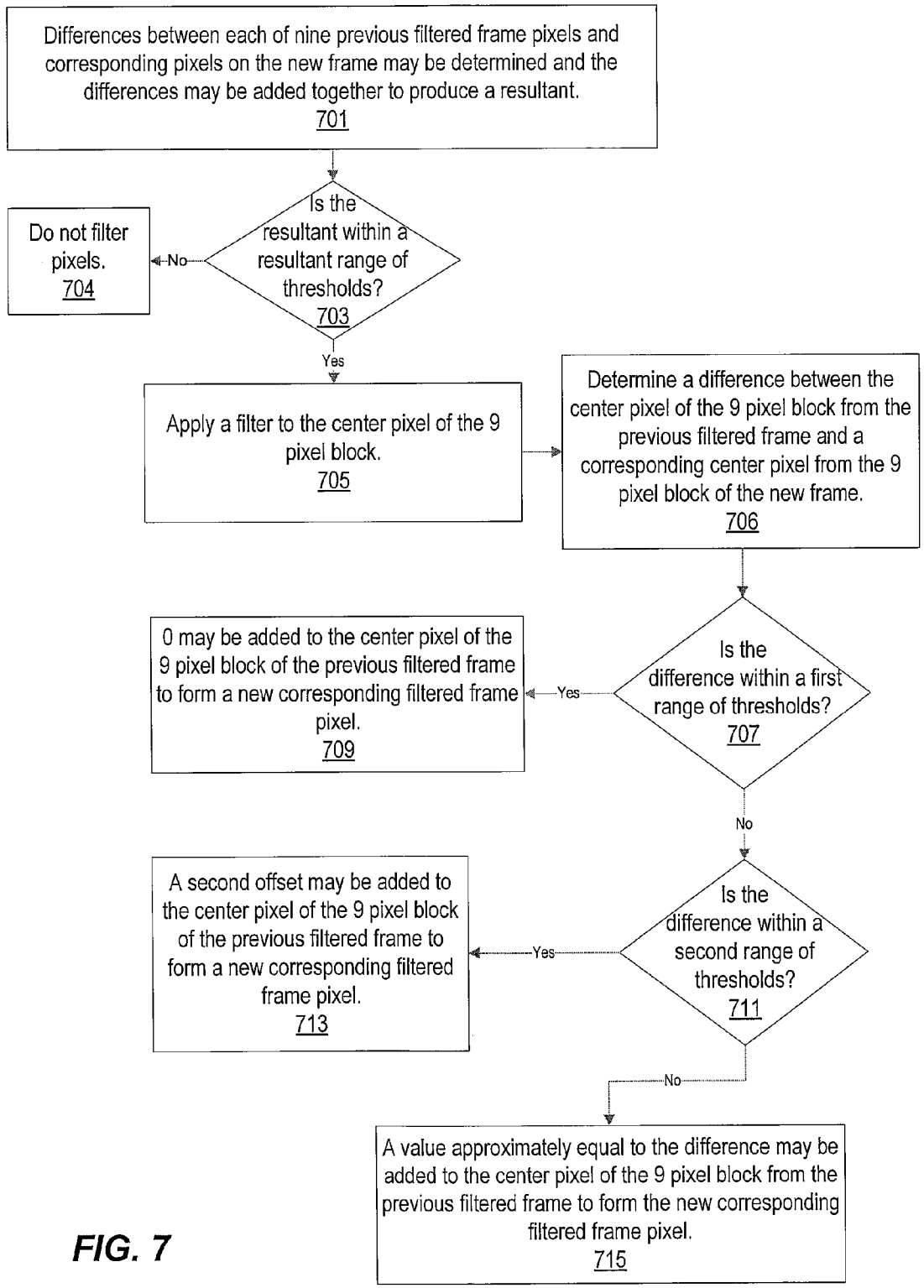
FIG. 7 illustrates a specific embodiment of the method for temporal filtering using various thresholds, according to an embodiment.

FIG. 7 illustrates a specific embodiment of the method for temporal filtering using various thresholds, according to an embodiment. It should be noted that in various embodiments of the methods described below, one or more of the elements described may be performed concurrently, in a different order than shown, or may be omitted entirely. Other additional elements may also be performed as desired.

At 701, differences between each of nine previous filtered frame pixels (in a three by three block of pixels) and corresponding pixels on the new frame may be determined and the differences may be added together to produce a resultant.

At 703, a determination may be made as to whether the resultant is within a resultant range of thresholds (e.g., −32 to 32). At 704, if the resultant is not within the resultant range of thresholds, a filter may not be applied.

At 705, if the resultant is within the resultant range of thresholds, a filter may be applied to the center pixel of the 9 pixel block (e.g., as provided below).

At 706, a difference between the center pixel of the 9 pixel block from the previous filtered frame and a corresponding center pixel from the 9 pixel block of the new frame may be determined.

At 707, a determination may be made as to whether the difference is within a first range of thresholds (e.g., −5 to 5 as seen in region 303 of FIG. 3*b*).

At 709, if the difference is within the first range of thresholds, 0 may be added to the center pixel of the 9 pixel block from the previous filtered frame to form the new corresponding filtered frame pixel.

At 711, if the difference is not within the first range of thresholds, a determination may be made as to whether the difference is within a second range of thresholds (e.g., −32 to −5 and 5 to 32 as seen in regions 305*a,b* of FIG. 3*b*).

At 713, if the difference is within the second range of thresholds, a second offset may be added to the center pixel of the 9 pixel block from the previous filtered frame to form the new corresponding filtered frame pixel. In some embodiments, the second offset may be determined from a non-linear function based on the difference (e.g., see regions 305*a,b* of FIG. 3*b*).

At 715, if the difference is not within the first range of thresholds and the difference is not within the second range of thresholds, a value approximately equal to the difference may be added to the center pixel of the 9 pixel block from the previous filtered frame to form the new corresponding filtered frame pixel. The processing may then continue by analyzing the pixel next to the center pixel in the previous filtered frame and its 8 surrounding pixels.

In some embodiments, the new filtered frame may then be used for additional motion detection (e.g., by comparing the frame to a previous filtered frame) and for calculation of respective vector quantities for transmission of video data. In some embodiments, the entire filtered frame may be sent (or, for example, the non-zero pixels). In some embodiment, the processing may be performed on the receiving end to minimize noise in a displayed frame. Other uses of the processing are also contemplated.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for performing temporal filtering of video frames, comprising:

storing a first video frame at a first time;
receiving a second video frame at a second time, wherein the second time is after the first time;
determining a difference between a first pixel of the first video frame and a corresponding second pixel of the second video frame;
generating a filtered second video frame based on said determining the difference between the first pixel and the corresponding second pixel, wherein said generating comprises:
if the difference is within a first range of thresholds, adding a first offset to the first pixel to form a filtered pixel;
if the difference is not within the first range of thresholds, and the difference is within a second range of thresholds, adding a second offset to the first pixel to form the filtered pixel, wherein the second offset is greater than the first offset, wherein the second range of thresholds is greater than the first range of thresholds; and
if the difference is greater than the first range of thresholds and the second range of thresholds, adding a value approximately equal to the difference to the first pixel to form the filtered pixel;
providing the filtered second video frame for display.

2. The method of claim 1, wherein the first and second video frames are comprised in a video, wherein the first video frame is a video frame prior to the second video frame in the video.

3. The method of claim 1, wherein the first video frame is a previous filtered frame and wherein the second video frame is a new video frame.

4. The method of claim 1, wherein the first offset is approximately 0.

5. The method of claim 1, wherein the second offset is determined using a look-up table based on the difference.

6. The method of claim 1, wherein the first range of thresholds and the second range of thresholds is approximately centered on 0.

7. The method of claim 1, wherein the first pixel is an ten bit pixel and wherein the first range of thresholds extends from approximately a range of −5 to +5.

8. The method of claim 1, wherein the first pixel is an ten bit pixel and wherein the second range of thresholds extends from approximately a range of −5 to −32 and approximately a range of 5 to 32.

9. The method of claim 1, wherein said generating the filtered second video frame is based on performing said determining for a plurality of pixels of the first video frame and a corresponding plurality of pixels of the second video frame.

10. The method of claim 1, wherein said providing the filtered second video frame for display comprises transmitting the filtered second video frame over a network.

11. A non-transitory computer accessible memory medium storing program instructions for performing temporal filtering of video frames, wherein the program instructions are executable by a processor to:

store a first video frame at a first time;
receive a second video frame at a second time, wherein the second time is after the first time;
determine a difference between a first pixel of the first video frame and a corresponding second pixel of the second video frame;
generate a filtered second video frame based on said determining the difference between the first pixel and the corresponding second pixel, wherein said generating comprises:
if the difference is within a first range of thresholds, adding a first offset to the first pixel to form a filtered pixel;

if the difference is not within the first range of thresholds, and the difference is within a second range of thresholds, adding a second offset to the first pixel to form the filtered pixel, wherein the second offset is greater than the first offset, wherein the second range of thresholds is greater than the first range of thresholds; and if the difference is greater than the first range of thresholds and the second range of thresholds, adding a value approximately equal to the difference to the first pixel to form the filtered pixel;

provide the filtered second video frame for display.

12. The non-transitory computer accessible memory medium of claim 11, wherein the first and second video frames are comprised in a video, wherein the first video frame is a video frame prior to the second video frame in the video.

13. The non-transitory computer accessible memory medium of claim 11, wherein the first video frame is a previous filtered frame and wherein the second video frame is a new video frame.

14. The non-transitory computer accessible memory medium of claim 11, wherein the first offset is approximately 0.

15. The non-transitory computer accessible memory medium of claim 11, wherein the second offset is determined using a look-up table based on the difference.

16. The non-transitory computer accessible memory medium of claim 11, wherein the first range of thresholds and the second range of thresholds is approximately centered on 0.

17. The non-transitory computer accessible memory medium of claim 11, wherein the first pixel is an ten bit pixel and wherein the first range of thresholds extends from approximately a range of −5 to +5.

18. The non-transitory computer accessible memory medium of claim 11, wherein the first pixel is an ten bit pixel and wherein the second range of thresholds extends from approximately a range of −5 to −32 and approximately a range of 5 to 32.

19. The non-transitory computer accessible memory medium of claim 11, wherein said generating the filtered second video frame is based on performing said determining for a plurality of pixels of the first video frame and a corresponding plurality of pixels of the second video frame.

20. The method of claim 1, wherein said providing the filtered second video frame for display comprises transmitting the filtered second video frame over a network.

21. A video conferencing system, comprising:
a video display;
a video codec coupled to the video display, wherein the video codec is configured to send/receive video frames to/from a remote video conferencing system, wherein the video codec comprises a processor and memory; wherein the memory is configured to store program instructions executable by the processor to:
store a first video frame at a first time;
receive a second video frame at a second time, wherein the second time is after the first time;
determine a difference between a first pixel of the first video frame and a corresponding second pixel of the second video frame;
generate a filtered second video frame based on said determining the difference between the first pixel and the corresponding second pixel, wherein said generating comprises:

if the difference is within a first range of thresholds, adding a first offset to the first pixel to form a filtered pixel;

if the difference is not within the first range of thresholds, and the difference is within a second range of thresholds, adding a second offset to the first pixel to form the filtered pixel, wherein the second offset is greater than the first offset, wherein the second range of thresholds is greater than the first range of thresholds; and if the difference is greater than the first range of thresholds and the second range of thresholds, adding a value approximately equal to the difference to the first pixel to form the filtered pixel;

provide the filtered second video frame for display.

22. The video conferencing system of claim 21, wherein the first offset is approximately 0.

23. The video conferencing system of claim 21, wherein the second offset is determined using a non-linear function based on the difference.

24. The video conferencing system of claim 21, wherein the first and second video frames are comprised in a video, wherein the first video frame is a video frame prior to the second video frame in the video.

25. The video conferencing system of claim 21, wherein said providing the filtered second video frame for display comprises transmitting the filtered second video frame over a network.

26. The video conferencing system of claim 21, wherein said providing the filtered second video frame for display comprises providing the filtered second video frame to the video display.

27. A non-transitory computer accessible memory medium storing program instructions for performing temporal filtering of video frames, wherein the program instructions are executable by a processor to:
store a first video frame at a first time;
receive a second video frame at a second time, wherein the second time is after the first time;
determine a difference between a first pixel of the first video frame and a corresponding second pixel of the second video frame;
generate a filtered second video frame based on said determining the difference between the first pixel and the corresponding second pixel, wherein said generating comprises:

if the difference is within a first range of thresholds, adding a first offset to the first pixel to form a filtered pixel;

if the difference is not within the first range of thresholds, and the difference is within a second range of thresholds, adding a second offset to the first pixel to form the filtered pixel, wherein the second offset is greater than the first offset, wherein the second range of thresholds is greater than the first range of thresholds; and if the difference is greater than the first range of thresholds and the second range of thresholds, using the second pixel without filtering;

provide the filtered second video frame for display.

28. The memory medium of claim 27, wherein the first video frame is a weighted average of a plurality of video frames.

* * * * *